(12) United States Patent
Haavanlammi et al.

(10) Patent No.: US 7,799,114 B2
(45) Date of Patent: Sep. 21, 2010

(54) METHOD FOR RECOVERING GOLD

(75) Inventors: Liisa Haavanlammi, Espoo (FI); Olli Hyvärinen, Pori (FI); Marika Tiihonen, Pori (FI); Reijo Tontti, Pori (FI)

(73) Assignee: Outotec Oyj, Espoo (FI)

( * ) Notice: Subject to any disclaimer, the term of this patent is extended or adjusted under 35 U.S.C. 154(b) by 127 days.

(21) Appl. No.: 12/162,845

(22) PCT Filed: Feb. 9, 2007

(86) PCT No.: PCT/FI2007/000030

§ 371 (c)(1),
(2), (4) Date: Jul. 31, 2008

(87) PCT Pub. No.: WO2007/093666

PCT Pub. Date: Aug. 23, 2007

(65) Prior Publication Data

US 2009/0158894 A1    Jun. 25, 2009

(30) Foreign Application Priority Data

Feb. 17, 2006  (FI) .................................. 20060149

(51) Int. Cl.
*C22B 11/06* (2006.01)
*C22B 3/04* (2006.01)
*C22B 3/22* (2006.01)
*C01G 7/00* (2006.01)
*C01B 7/09* (2006.01)

(52) U.S. Cl. ............................ 75/744; 75/743; 423/38; 423/39; 423/46; 423/500; 423/504

(58) Field of Classification Search .................. 74/744, 74/743; 423/500, 504
See application file for complete search history.

(56) References Cited

U.S. PATENT DOCUMENTS

| 2,359,221 | A | * | 9/1944 | Kenaga | .................... 423/500 |
| 4,244,735 | A | | 1/1981 | Reynolds et al. | .......... 75/101 R |
| 4,551,213 | A | | 11/1985 | Wilson | ........................ 204/111 |
| 4,668,289 | A | | 5/1987 | Langer et al. | ............. 75/118 R |
| 5,487,819 | A | * | 1/1996 | Everett | ........................ 205/347 |
| 6,007,600 | A | | 12/1999 | Hyvarinen et al. | ............ 75/740 |
| 6,929,677 | B2 | | 8/2005 | Hamalainen | ................. 75/743 |

FOREIGN PATENT DOCUMENTS

| WO | WO 9400606 | | 1/1994 |
| WO | WO 03/091463 A1 | * | 11/2003 |
| WO | WO 03091463 | | 11/2003 |
| WO | WO 2005106052 | | 11/2005 |

* cited by examiner

*Primary Examiner*—Jerry Lorengo
*Assistant Examiner*—Jared Wood
(74) *Attorney, Agent, or Firm*—Buchanan Ingersoll & Rooney PC

(57) ABSTRACT

The invention relates to a method for recovering gold in connection with the hydrometallurgical production of copper from a waste or intermediate product containing sulphur and iron that is generated in the leaching of the copper raw material. The recovery of both copper and gold occurs in a chloride environment. The gold contained in the waste or intermediate is leached by means of divalent copper, oxygen and alkali bromide in a solution of copper (II) chloride and alkali chloride, in conditions where the oxygen-reduction potential is a maximum of 650 mV and the pH a minimum of 0.5. The bromide accelerates the dissolution of the gold.

10 Claims, 2 Drawing Sheets

METHOD FOR RECOVERING GOLD

This application is a national phase entry under 35 U.S.C. §371 of International Application No. PCT/FI2007/000030 filed Feb. 9, 2007, hereby incorporated by reference, which itself claims priority to Finnish Patent Application No. 20060149, filed Feb. 17, 2006, hereby incorporated by reference.

BACKGROUND

1. Field

Disclosed herein is a method for recovering gold in connection with the hydrometallurgical production of copper from a waste or intermediate product containing sulphur and iron that is generated in the leaching of the copper raw material. The recovery of both copper and gold occurs in a chloride environment. The gold contained in the waste or intermediate is leached by means of divalent copper, oxygen and bromide in a solution of copper (II) chloride-sodium chloride, in conditions where the oxygen-reduction potential is a maximum of 650 mV and the pH is between 0.5-2.5.

2. Description of Related Art

The Hydrocopper™ method for fabricating copper hydrometallurgically from a raw material containing copper such as copper sulphide concentrate is described in U.S. Pat. No. 6,007,600. According to the method, the raw material is leached counter-currently with an alkali chloride-copper chloride solution in several stages to form a monovalent copper (I) chloride solution. Part of the solution that is formed is routed to oxidation performed with chlorine gas, whereupon the copper (II) chloride generated is circulated back to concentrate leaching. Solution purification is performed on the remainder of the solution formed in raw material leaching. The pure cuprous chloride solution is precipitated by means of alkali hydroxide into copper (I) oxide and the oxide is reduced further into elemental copper. The alkali chloride solution formed during copper (I) oxide precipitation is processed further in chlorine-alkali electrolysis, from which the chlorine gas and/or chloride solution obtained is used for oxidising copper (I) chloride and/or raw material leaching, the alkali hydroxide generated in electrolysis is used for oxide precipitation and the hydrogen generated is used for elemental copper reduction. Gold recovery from the leaching residue is not described separately in connection with the method.

Several methods are known in the prior art, which are used for leaching gold from materials containing sulphur and iron in connection with a chloride-based copper recovery process.

U.S. Pat. No. 4,551,213 describes a method, according to which gold can be leached from sulphur-containing materials, particularly from the residues of hydrometallurgical processes. The preferred starting material for the method is residue from the CLEAR process. The CLEAR process is a hydrometallurgical copper recovery process, which takes place in a chloride environment and at raised pressure. The gold-containing residue is elutriated into water and the suspension obtained is adjusted so that it contains 12-38 weight percent of chloride. The oxidation-reduction potential is adjusted to the range of 650-750 mV and the pH value to be below 0. Copper (II) chloride or iron (III) chloride is added to the suspension to oxidise the gold contained in the raw material, whereupon it dissolves. It is mentioned in the publication that the oxidation-reduction potential must not rise above 750 mV, because above this value the sulphur will dissolve. There is no information in the publication about the amount of dissolved sulphur or iron.

EP patent 646185 concerns the recovery of copper from sulphidic concentrates by chloride leaching in atmospheric conditions. In the final stage of countercurrent leaching, gold is leached directly into the electrolyte from copper, zinc and lead electrolysis with a high oxidation potential. It is an essential feature of the method that the high oxidation potential is achieved by means of a halide complex such as $BrCl^-_2$, which is formed in electrolysis. According to example 4, which describes gold leaching, gold dissolves at an oxidation-reduction potential of about 700 mV vs Ag/AgCl.

WO patent application 03/091463 describes a method for leaching gold from a leaching residue or intermediate containing iron and sulphur, which is generated in the atmospheric chloride leaching of copper sulphide concentrate. It states in the publication that it is possible to leach gold from a material containing iron and sulphur into an aqueous solution of copper (II) chloride and sodium chloride by means of divalent copper and oxygen in conditions where the oxidation-reduction potential is below 650 mV and the pH value of the solution is in the range of 1-3. In these conditions the iron does not yet dissolve and the sulphur remains largely undissolved, thus avoiding the costs that are incurred when removing iron and sulphur from the solution. The recovery of gold from the solution is carried out by means of one of the methods of the prior art such as electrolysis or activated carbon. The method in question is fairly good in itself, but in practice however it is a little slow.

SUMMARY

Now a new method has been developed for leaching gold from a leaching residue or intermediate containing iron and sulphur, which is generated in the atmospheric chloride leaching of copper sulphide concentrate and is essentially free of copper. We have found that when gold is leached from a material containing iron and sulphur into an aqueous solution of copper (II) chloride and alkali chloride and an oxygen-containing gas is fed into the solution, a small amount of bromide accelerates the time required for the gold to dissolve. Leaching takes place thus by means of divalent copper in conditions where the oxidation-reduction potential is regulated with oxygen in the range of 600-650 mV vs. Ag/AgCl electrode and the pH value of the solution is adjusted to the range of 0.5-2.5, preferably 0.5-1.5. The feed of bromide accelerates gold dissolution without causing the oxidation-reduction potential of the leaching to rise above the value of 650 mV.

The gold-containing residue or intermediate is elutriated into an alkali chloride solution containing copper (II) chloride making a suspension, and the oxidation-reduction potential required for gold leaching is achieved just by means of divalent copper and oxygen. In a particular embodiment, to enhance leaching some alkali bromide such as sodium or potassium bromide is fed into the suspension that is formed so that the Br ion concentration of the gold leaching step is 0.5-30 g/l, preferably 8-15 WI. After the gold leaching stage the gold-containing solution is routed to the gold recovery step, after which the solution is circulated back to the leaching stage.

Leaching occurs in atmospheric conditions at a temperature which is in the range between room temperature and the boiling point of the suspension, preferably however at a temperature between 80° C. and the boiling point of the suspension. Gold recovery from the solution is made using some method known in the prior art such as electrolysis or by means of activated carbon. The remaining residue is a dischargeable residue. When the gold has been recovered from the solution, the solution is circulated back to the gold leaching stage.

It is advantageous to connect the method now developed to a copper concentrate chloride leaching process as a sub-process. As mentioned above, one such process is described in e.g. U.S. Pat. No. 6,007,600. In the method in question a raw material containing copper sulphide such as concentrate is leached counter currently with a solution of alkali chloride and copper (II) chloride, NaCl—$CuCl_2$, in several stages to form a solution of monovalent copper (I) chloride, CuCl. The alkali chloride solution formed in the process is processed in chlorine alkali electrolysis and the alkali hydroxide, chlorine and hydrogen formed in electrolysis are exploited in various stages of the process. A residue remains after concentrate leaching, which mainly contains the sulphur and iron of the raw material as well as the gold contained in the raw material. The method now developed focuses on the residue of gold leaching, which is formed in the type of process mentioned above. The leaching step of a waste or intermediate that contains gold occurs in principle separately from the actual concentrate leaching step, since the solution from which gold is separated, instead of being returned to the concentrate leaching circuit, is circulated back to gold leaching.

The oxidation-reduction potential in the gold leaching stage is measured with Pt and Ag/AgCl electrodes and the potential is kept at a value of maximum 650 mV, preferably at a maximum of 640 mV. When the oxidation-reduction potential is kept below a value of 650 mV, sulphur does not yet dissolve from the residue, and remains as elemental sulphur. The preferred pH range is between 0.5 and 1.5, so that the iron in the residue remains mostly undissolved. The oxidation gas used may be air, oxygen-enriched air or oxygen. The amount of divalent copper, $Cu^{2+}$, in solution is preferably 40-100 g/l and the amount of sodium chloride in the range of 200-330 g/l.

If the chloride solution used in gold leaching is a sodium chloride solution, the alkali bromide to be fed is also preferably sodium bromide. Sodium is lower in price than potassium, so its use is therefore justified. The majority of bromide to be fed into the gold leaching stage is in circulation inside the leaching stage. A small part of it, 0.5-10%, however, is removed with the filtrate, which is formed during the filtration performed on the gold leaching residue. To avoid bromine losses, the filtrate is routed to the oxidation stage belonging to the concentrate leaching step. In the oxidation stage, part of the copper (I) chloride formed in concentrate leaching is oxidised back to copper (II) chloride by means of the chlorine formed in chlorine alkali electrolysis, which is fed into the final stage of the concentrate leaching process. Chlorine gas also oxidises the bromide in the filtrate into bromine gas, which is recovered in a scrubber connected to the oxidation stage, in which it dissolves into the washing fluid. As for the scrubber washing fluid, it is routed to the gold leaching stage. The scrubber washing fluid is circulated back to the gold leaching stage, in which the leaching stage slurry reduces the bromine back into bromide.

BRIEF DESCRIPTION OF DRAWINGS

Embodiments of the method described herein is described further in the flow chart in FIG. 1, where gold recovery is combined with a copper sulphide concentrate leaching process.

DETAILED DESCRIPTION OF SPECIFIC EMBODIMENTS

Figure 1:
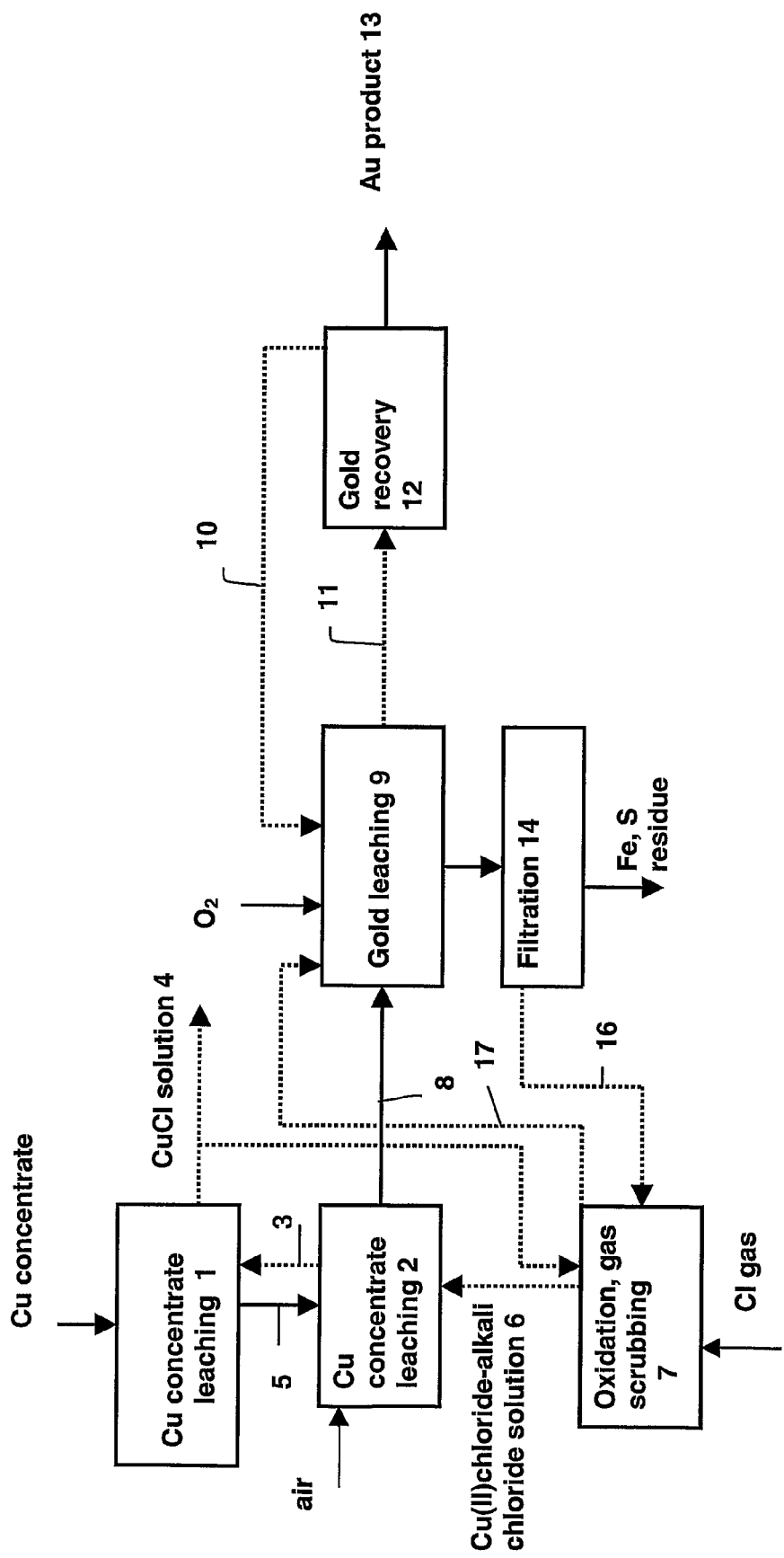
Figure 2:
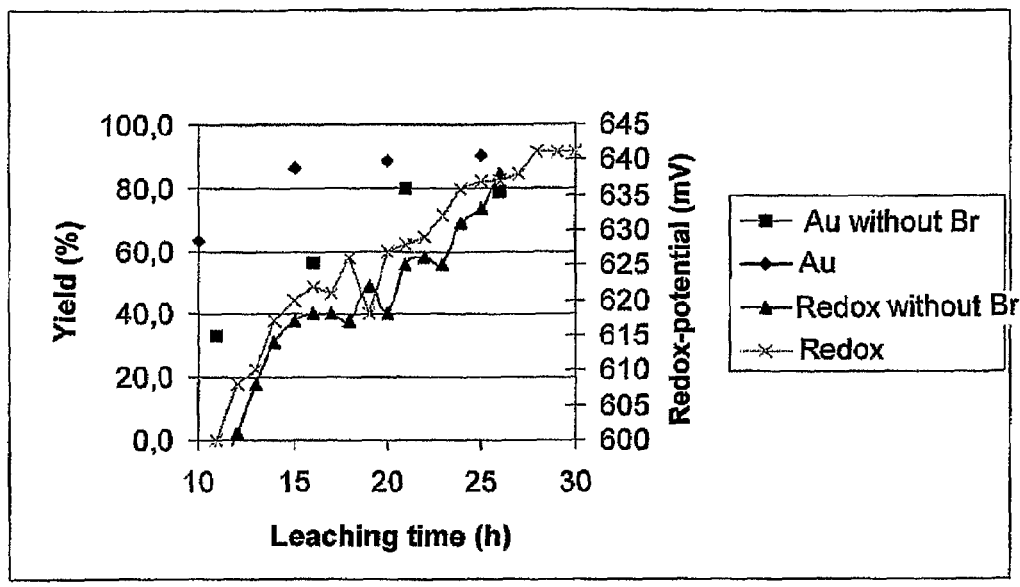
FIG. 2 is a graphical presentation of the effect of the bromide addition as a yield function of the dissolution rate of gold and oxidation-reduction potential according to example 1.
Figure 3:
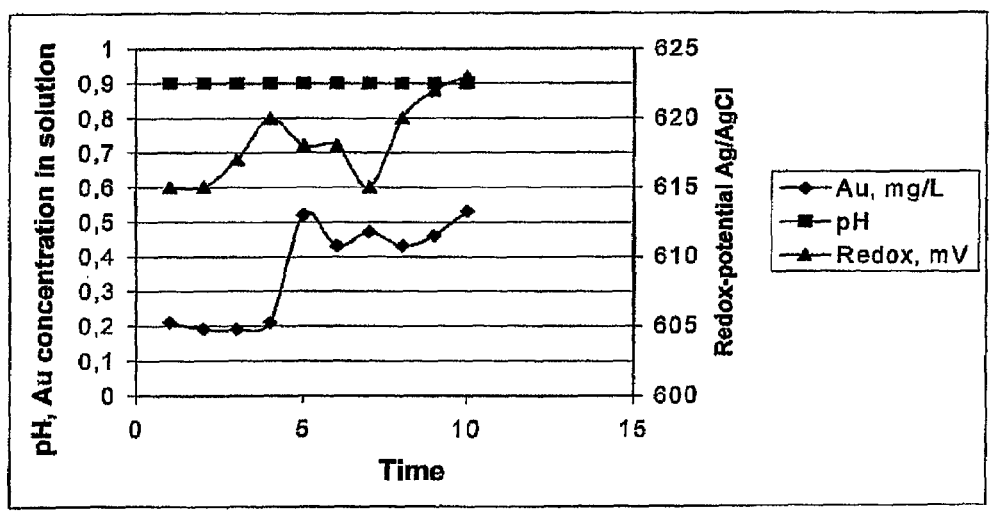
FIG. 3 is a graphical presentation of the effect of the addition of bromide on the dissolution rate of gold and oxidation-reduction potential according to example 2.

The flow chart according to FIG. 1 is one example of an embodiment disclosed herein. The solid arrows in FIG. 1 describe the flow of solids and the dashed arrows the flow of the solution.

A copper sulphide raw material, such as copper sulphide concentrate, is fed into the first leaching stage 1, into which is circulated a solution 3, which is an aqueous solution of copper (II) chloride and alkali chloride exiting the second leaching stage 2. When we speak later of alkali chloride for the sake of simplicity there is only mentioned sodium chloride, although some other alkali can be used in its place if necessary. Each leaching stage is presented as a single block, but it is clear that each stage generally consists of several reactors and thickening. In the copper concentrate leaching stages the copper dissolves into the process solution, and the solution is routed to thickening. After the first leaching stage thickening, the overflow solution 4 contains copper chloride, in which there is about 70 g/l of mainly monovalent copper, and this is routed according to the Hydrocopper™ process to copper recovery (not shown in detail in the drawing). The leaching of the solids contained in underflow 5 is continued in the second leaching stage 2 with chloride solution 6. The chloride solution is formed from the sodium chloride solution which is obtained from chlorine alkali electrolysis belonging to the Hydrocopper™ process, and the copper (II) chloride solution, which is formed in oxidation stage 7 by oxidizing part of the copper (I) chloride 4 formed in the first leaching stage.

The solution 3 exiting the thickening of the second leaching stage 2 is routed to the first leaching stage 1 to leach the concentrate. Leaching of the residue 8 exiting the second leaching stage is continued in a separate leaching stage 9 to leach out the gold contained in it. The gold leaching stage 9 also generally takes place in several reactors, but for the sake of simplicity the whole stage is depicted as one unit. The precipitate in the gold leaching stage is leached with a concentrated solution of copper (II) chloride and sodium chloride 10, particular embodiments of which in which the $Cu^{2+}$ concentration is 40-100 g/l and the sodium chloride concentration is 200-330 g/l and the amount of bromide calculated as bromine ions is 0.5-30 g/l. Oxygen is in addition routed into the leaching stage, which allows the oxidation-reduction potential of the solution to be raised to an adequate level for gold leaching i.e. a range of 600-650 mV vs. Ag/AgCl electrode.

In particular embodiments, the alkali bromide is preferably potassium or sodium bromide and in the early stage of leaching bromide is routed as a finely ground solid into the gold leaching stage. Since there is a closed circulation of solution in the gold leaching stage, the continuous addition of bromide is not required, and only the small amount that is consumed in the process is replaced subsequently with a bromide feed. The bromide feed shortens the gold leaching time, because the gold dissolved as a result of the bromide remains in solution and is not precipitated back. Gold also possibly dissolves as a bromide complex more easily than as a chloride complex.

At the end of the gold leaching stage 9, solids separation is carried out. The overflow 11 that is formed is routed either as it is or filtered to gold recovery 12, which takes place for instance by means of activated carbon in carbon columns. A gold product 13 is obtained from the columns. The solution removed from the columns is a gold-free solution 10, which is circulated back to the gold leaching stage 9. The thickening underflow from the gold recovery stage i.e. the precipitate, after normal further treatment such as filtration and washing 14 comprises the final residue 15, which includes almost all the sulphur of the concentrate and the majority of the iron. The residue filtrate and wash water 16 contains dissolved iron and a small amount of the bromide circulating in the gold leaching stage. The filtrate and wash water 16 are routed to the oxidation stage 7 of the concentrate leaching process. The chlorine fed into the oxidation stage oxidises the bromide into bromine gas. The gas generated in the oxidation stage is routed to the gas scrubber belonging to the stage, where the bromine that is generated dissolves into the scrubber washing fluid. The scrubber washing fluid 17 is routed to the gold leaching stage, and the leaching stage slurry reduces the bromine back into bromide. This ensures that the bromide circulates only in this stage.

The method is described further by means of the following examples.

Example 1

In a test a residue containing an average of 7 g/t of gold, which was formed in the leaching of a raw material containing copper sulphide, was leached as a batch test. The residue was leached in batch tests in a 5-liter reactor, which was equipped with online electrodes for the measurement of pH and the oxidation-reduction potential. The tests were carried out at a temperature of 95° C. The estimated gold leaching time was 30-40 h. At the start of leaching the pH was adjusted to a value of 2.0 by means of oxygen and hydrochloric acid feed, after which the pH was allowed to fall freely, but not below the value of 0.5. The pH should be below a value of 2.5 at the start of leaching too, to prevent the copper in the solution from precipitating as atacamite. During leaching the redox potential was raised gradually (over 5-8 hours) to a value of 580 mV and subsequently 15 g/l of sodium bromide was added to improve gold leaching. The bromide addition was repeated at 10-hourly intervals and at that point the amount was 10 g/l. The results are depicted in diagram 2. The addition of bromide has a beneficial effect on the dissolving of gold particularly at lower potential levels. When there was sodium bromide in the solution, gold dissolved at a potential of 630 mV, which is an easy potential to achieve with a feed of oxygen.

Example 2

The effect of bromine in a continuous leaching circuit was tested in a laboratory pilot run. The gold circuit leaching circulation was not connected to the copper concentrate leaching circuit; only the copper-free solids from the copper concentrate leaching circuit were transferred to the gold leaching stage. There were two 5-liter leaching reactors in the gold leaching stage, in both of which were baffles, mixers and online electrodes for measurement of the pH and redox potential. The temperature of the leaching circuit in the leaching reactors was 95.degree. C. The retention time of the solids in the reactors was 10-15 hours. The pH of the first leaching reactor was kept at a value of 1.0 and the pH of the second reactor was 0.9. The redox potential in leaching was a maximum of 630 mV. The $Cu_2+$ ion concentration of the solution was 60 g/l and the NaCl concentration 250 g/l. The progress of leaching is depicted in diagram 3. 8-10 g/l of bromine was added to the gold circuit solution at point number 5. As the diagram shows, after the addition of bromine the gold concentration of the solution doubled.

The invention having been described above with reference to certain specific embodiments thereof, it will be recognized that these embodiments do not limit the scope of the appended claims.

The invention claimed is:

1. A method for recovering gold from an essentially copper-free leaching residue or intermediate containing iron and sulphur, which is generated in an atmospheric chloride leaching process of copper sulphidic raw material, comprising leaching gold from the residue or intermediate by:
   contacting the residue or intermediate with an aqueous solution of copper (II) chloride and alkali chloride at atmospheric pressure to form a suspension;
   introducing an oxygen-containing gas to the suspension;
   maintaining the oxidation reduction potential of the suspension to a maximum value of 650 mV vs. Ag/AgCl electrode;
   adding alkali bromide to the suspension in an amount such that the amount of dissolved bromide ions in solution the suspension is 0.5-30 g/L;
   maintaining the pH of the suspension at a value of 0.5-2.5; and
   recovering the leached gold, and an undissolved precipitate formed in the gold leaching stage comprising waste sulphur and iron;
   wherein said recovering an undissolved precipitate comprises: filtering and water washing the undissolved precipitate to obtain a filtrate wherein the filtrate and wash water contain an amount of bromide that is 0.5-10% of the total amount of dissolved bromide ions in the suspension; and oxidizing the filtrate and wash water in an oxidation stage of a copper sulphide concentrate leaching process, whereby bromide in the filtrate and wash water is oxidized into bromine gas by means of chlorine gas;
   recovering the resulting bromine gas by a scrubber in the oxidation stage; and
   recirculating a washing fluid of the gas scrubber containing said bromine gas to the gold leaching stage.

2. The method according to claim 1, wherein the amount of dissolved bromide ions in the suspension is 8-15 g/L.

3. The method according to claim 1, wherein the alkali bromide is sodium or potassium bromide.

4. The method according to claim 1, further comprising reducing the bromine gas contained in the washing fluid of the gas scrubber into bromide in the gold leaching stage.

5. The method according to claim 1, wherein the maintaining of the oxidation-reduction potential of the suspension in the gold leaching stage comprises maintaining said oxidation-reduction potential in the range of 580-640 mV.

6. The method according to claim 1, wherein the maintaining of the pH of the suspension in the gold leaching stage comprises maintaining said pH at a value of 0.5-1.5.

7. The method according to claim 1, wherein the amount of divalent copper in the suspension in the gold leaching stage is 40-100 g/L.

8. The method according to claim 1, wherein the amount of alkali chloride in the suspension in the gold leaching stage is 200-330 g/L.

9. The method according to claim 1, further comprising maintaining the temperature of the suspension in the gold leaching stage in the range between 80° C. and the boiling point of the suspension.

10. The method according to claim 1, wherein the oxygen-containing gas is air, oxygen-enriched air or oxygen.

* * * * *